US011205276B2

(12) United States Patent
Gu

(10) Patent No.: US 11,205,276 B2
(45) Date of Patent: Dec. 21, 2021

(54) OBJECT TRACKING METHOD, OBJECT TRACKING DEVICE, ELECTRONIC DEVICE AND STORAGE MEDIUM

(71) Applicant: BOE TECHNOLOGY GROUP CO., LTD., Beijing (CN)

(72) Inventor: Yu Gu, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 16/835,929

(22) Filed: Mar. 31, 2020

(65) Prior Publication Data

US 2021/0056715 A1 Feb. 25, 2021

(30) Foreign Application Priority Data

Aug. 20, 2019 (CN) .......................... 201910769191.0

(51) Int. Cl.
*G06T 7/292* (2017.01)
*G06K 9/00* (2006.01)
*H04N 7/18* (2006.01)

(52) U.S. Cl.
CPC .......... *G06T 7/292* (2017.01); *G06K 9/00771* (2013.01); *H04N 7/181* (2013.01); *G06T 2207/30232* (2013.01)

(58) Field of Classification Search
CPC . B24D 18/00; B24D 18/0009; E21B 10/5673; E21C 35/183; E21C 35/1837;
(Continued)

(56) References Cited

U.S. PATENT DOCUMENTS

2016/0004906 A1 1/2016 Nerayoff et al.
2016/0306535 A1* 10/2016 Krishnamoorthy .......................... G06F 3/04847
2020/0027240 A1* 1/2020 Yang .................. G06K 9/00342

FOREIGN PATENT DOCUMENTS

CN 101646067 A 2/2010
CN 101916383 A 12/2010
(Continued)

OTHER PUBLICATIONS

Office Action of CN Application No. 201910769191.0 and English translation, dated Sep. 3, 2020, 20 pages.
(Continued)

*Primary Examiner* — Joon Kwon
(74) *Attorney, Agent, or Firm* — Muncy, Geissler, Olds & Lowe, P.C.

(57) ABSTRACT

The present disclosure provides an object tracking method and an object tracking device. The object tracking method is applied to an image capturing system which includes at least two cameras having image capturing areas at least partially overlapped. The object tracking method includes: obtaining images captured by the at least two cameras, respectively; and respectively identifying objects in the images captured by the at least two cameras; obtaining a feature value of each object, and calculating a position of each object in each image in a global coordinate system; when there are two objects, which are respectively in the images captured by the at least two cameras and have an overall difference value being less than a threshold, counting the two objects as an identical object; wherein the overall difference value is a value determined according to a feature difference value and a position difference value of the two objects.

15 Claims, 3 Drawing Sheets

(58) Field of Classification Search
CPC ...... G06K 9/00771; G06T 2207/30232; G06T 7/292; H04N 7/181
See application file for complete search history.

(56) References Cited

FOREIGN PATENT DOCUMENTS

| | | |
|---|---|---|
| CN | 104881637 A | 9/2015 |
| CN | 105069795 A | 11/2015 |
| CN | 107255468 A | 10/2017 |
| CN | 108629791 A | 10/2018 |
| CN | 109035299 A | 12/2018 |
| CN | 109784162 A | 5/2019 |

OTHER PUBLICATIONS

Office Action of CN Application No. 201910769191.0 and English translation, 20 pages.

\* cited by examiner

OBJECT TRACKING METHOD, OBJECT TRACKING DEVICE, ELECTRONIC DEVICE AND STORAGE MEDIUM

CROSS-REFERENCE TO RELATED APPLICATION

This application claims the benefit and priority of Chinese Application No. 201910769191.0, filed on Aug. 20, 2019, which is incorporated herein by reference in its entirety.

TECHNICAL FIELD

The present disclosure relates to the field of image vision technology, and in particular to an object tracking method, an object tracking device, an electronic device and a storage medium.

BACKGROUND

In the field of smart retail and smart finance, generation of pedestrian moving lines is very important. The pedestrian moving line technology usually needs to obtain images of a monitoring area based on a camera, analyze the images, detect a pedestrian, and track and re-identify the pedestrian, thereby obtaining a full trajectory of the pedestrian.

SUMMARY

One embodiment of the present disclosure provides an object tracking method applied to an image capturing system which includes at least two cameras having image capturing areas at least partially overlapped, the object tracking method including: obtaining images captured by the at least two cameras, respectively; and respectively identifying objects in the images captured by the at least two cameras; obtaining a feature value of each object, and calculating a position of each object in each image in a global coordinate system; when there are two objects, which are respectively in the images captured by the at least two cameras and have an overall difference value being less than a threshold, counting the two objects as an identical object; wherein the overall difference value is a value determined according to a feature difference value and a position difference value of the two objects.

Optionally, the obtaining a feature value of each object, includes: extracting a feature vector of each object as the feature value of each object. After the obtaining a feature value of each object, the method further includes: calculating square of a difference value between feature vectors of any two objects; obtaining a calculation result by performing batch norm calculation and fully connected layers calculation on the square of the difference value, and taking a probability value obtained by processing the calculation result through an S-shaped growth curve function as a feature difference value of the any two objects; wherein difference between the any two objects decreases as the probability value increases.

Optionally, the calculating a position of each object in each image in a global coordinate system, includes: calculating coordinates of each object in each image, respectively; obtaining a conversion homography matrix of coordinates in each image and coordinates in the global coordinate system; converting the coordinates of each object in each image into coordinates in the global coordinate system through the conversion homography matrix, and taking the coordinates in the global coordinate system as the position of the each object in the global coordinate system.

Optionally, after the obtaining a feature value of each object, and calculating a position of each object in each image in a global coordinate system, the method further includes: calculating a weighted average value of a feature difference value and a position difference value of any two objects as an overall difference value of the any two objects.

Optionally, the at least two cameras include a first camera and a second camera; after counting the two objects as an identical object, the method further includes: numbering objects captured by the first camera and the second camera with numbers respectively, and taking the numbers as identity information of the corresponding objects; recording in a first list, the identity information of matched identical objects among the objects captured by the first camera and the second camera, and setting a same index value corresponding to each group of matched identical objects; establishing a second list according to the identity information of the objects captured by the first camera in the first list, and filling the second list according to the objects captured by the first camera and corresponding index values recorded in the first list; wherein a length of the second list is the number of objects captured by the first camera; establishing a third list according to the identity information of the objects captured by the second camera in the first list, and filling the third list according to the objects captured by the second camera and corresponding index values recorded in the first list; wherein a length of the third list is the number of objects captured by the second camera.

Optionally, after the establishing a second list according to the identity information of the objects captured by the first camera in the first list, the method further includes: filling the second list according to objects captured by the first camera which are not recorded in the first list and index values.

Optionally, after the establishing a third list according to the identity information of the objects captured by the second camera in the first list, the method further includes: filling the third list according to objects captured by the second camera which are not recorded in the first list and index values.

One embodiment of the present disclosure provides an object tracking device applied to an image capturing system which includes at least two cameras having image capturing areas at least partially overlapped, the object tracking device including: a capturing-identifying circuit configured to obtain images captured by the at least two cameras, respectively; and respectively identify objects in the images captured by the at least two cameras; an obtaining circuit configured to obtain a feature value of each object, and calculate a position of each object in each image in a global coordinate system; a counting circuit configured to, when there are two objects, which are respectively in the images captured by the at least two cameras and have an overall difference value being less than a threshold, count the two objects as an identical object; wherein the overall difference value is a value determined according to a feature difference value and a position difference value of the two objects.

Optionally, the obtaining circuit includes: an extraction sub-circuit configured to extract a feature vector of each object as the feature value of each object. The object tracking device further includes: a feature vector difference calculation circuit configured to calculate square of a difference value between feature vectors of any two objects; a probability calculation circuit configured to obtain a calculation result by performing batch norm calculation and fully connected layers calculation on the square of the difference value, and take a probability value obtained by processing the calculation result through an S-shaped growth curve function as a feature difference value of the any two objects; wherein difference between the any two objects decreases as the probability value increases.

Optionally, the obtaining circuit includes: a coordinate calculation sub-circuit configured to calculate coordinates of each object in each image, respectively; a matrix obtaining sub-circuit configured to obtain a conversion homography matrix of coordinates in each image and coordinates in the global coordinate system; a conversion sub-circuit configured to convert the coordinates of each object in each image into coordinates in the global coordinate system through the conversion homography matrix, and take the coordinates in the global coordinate system as the position of the each object in the global coordinate system.

Optionally, the object tracking device further includes: an overall difference value calculation circuit configured to calculate a weighted average value of a feature difference value and a position difference value of any two objects as an overall difference value of the any two objects.

Optionally, the at least two cameras include a first camera and a second camera; the object tracking device further includes: a numbering circuit configured to number objects captured by the first camera and the second camera with numbers respectively, and take the numbers as identity information of the corresponding objects; a recording circuit configured to record in a first list, the identity information of matched identical objects among the objects captured by the first camera and the second camera, and set a same index value corresponding to each group of matched identical objects; a first filling circuit configured to establish a second list according to the identity information of the objects captured by the first camera in the first list, and fill the second list according to the objects captured by the first camera and corresponding index values recorded in the first list; wherein a length of the second list is the number of objects captured by the first camera; a second filling circuit configured to establish a third list according to the identity information of the objects captured by the second camera in the first list, and fill the third list according to the objects captured by the second camera and corresponding index values recorded in the first list; wherein a length of the third list is the number of objects captured by the second camera.

Optionally, the first filling circuit is further configured to fill the second list according to objects captured by the first camera which are not recorded in the first list and index values.

Optionally, the second filling circuit is further configured to fill the third list according to objects captured by the second camera which are not recorded in the first list and index values.

One embodiment of the present disclosure provides an electronic device including: a processor, a memory, and a computer program stored in the memory and executable on the processor; wherein the processor executes the computer program to implement steps of the above object tracking method.

One embodiment of the present disclosure provides a computer readable medium including a computer program thereon; wherein the computer program is executed by a processor to implement steps of the above object tracking method.

BRIEF DESCRIPTION OF THE DRAWINGS

In order to illustrate technical solutions according to embodiments of the present disclosure more clearly, drawings to be used in the description of the embodiments will be described briefly hereinafter. Apparently, the drawings described hereinafter are only some embodiments of the present disclosure, and other drawings may be obtained by those skilled in the art according to those drawings without creative work.

DETAILED DESCRIPTION

The technical solution of the present disclosure will be described hereinafter in a clear and complete manner in conjunction with the drawings and embodiments. Obviously, the following embodiments are merely a part of, rather than all of, the embodiments of the present disclosure, and based on these embodiments, a person skilled in the art may obtain the other embodiments, which also fall within the scope of the present disclosure.

In order to monitor a specific area, multiple cameras may be required to provide full coverage of the area as a single camera has a limited field of view. However, when one pedestrian appears in two cameras at the same time, if the two cameras are used for pedestrian detection, tracking and re-identifying separately, the system may consider that there are two persons, resulting in deviation in counting the number of objects and object tracking.

In view of this, one embodiment of the present disclosure provides an object tracking method. This object tracking method may be applied to an image capturing system. The image capturing system includes at least two cameras. There is at least partial overlap in image capturing areas of the at least two cameras.

It can be understood that the image capturing system includes multiple cameras, and image capturing areas of the various camera cover a specific monitoring area. For one part of the monitoring area, only one camera can capture images of the one part of the monitoring area. For another part of the monitoring area, there may be several cameras capable of capturing images of another part of the monitoring area.

Figure 1:
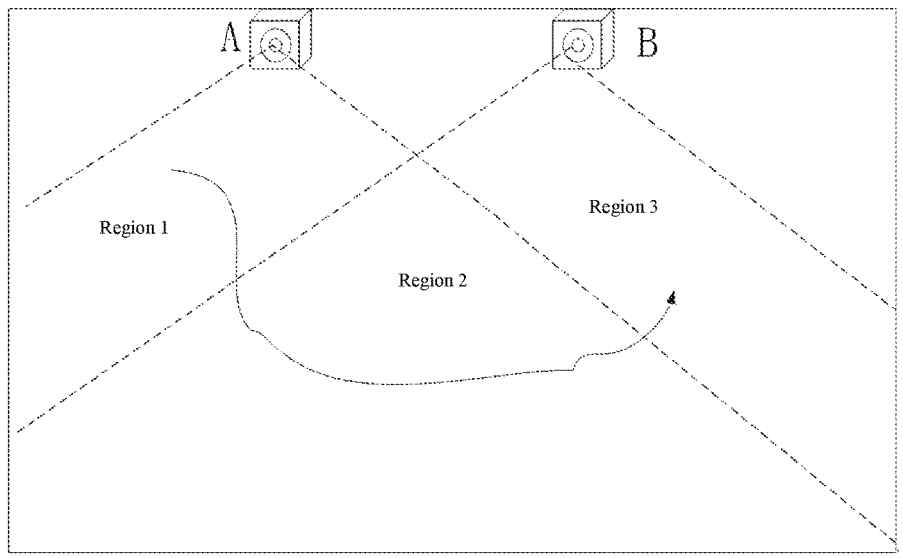
FIG. 1 is a schematic diagram showing monitoring areas of two cameras according to an embodiment of the present disclosure.

For example, as shown in FIG. 1, a monitoring area of a camera A covers a region 1 and a region 2; and a monitoring area of a camera B covers the region 2 and a region 3. In other words, for the region 2, both of the camera A and the camera B are capable of capturing images of this region. For each of the region 1 and the region 3, only one camera is capable of capturing images of this region.

Figure 2:
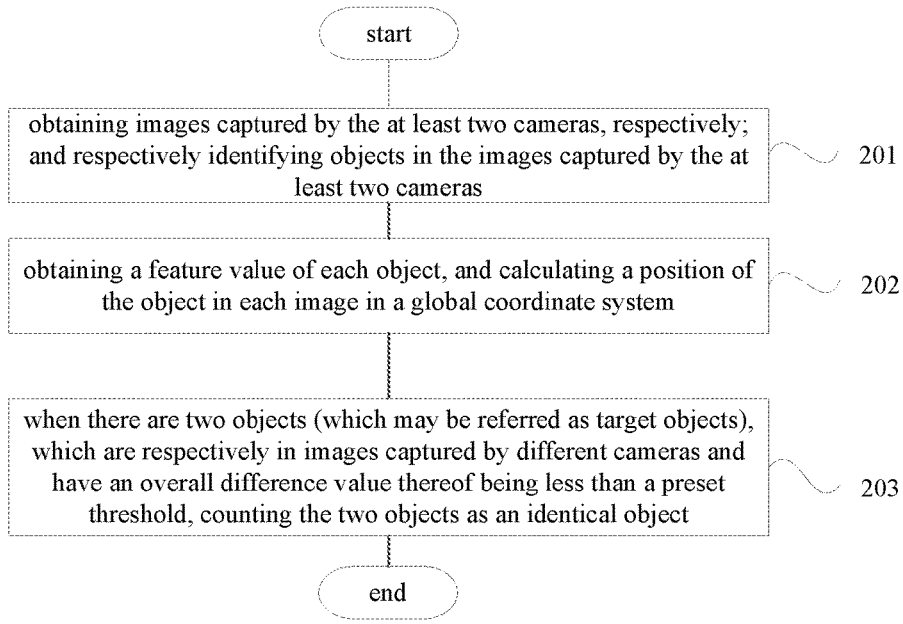
FIG. 2 is a flowchart of an object tracking method according to an embodiment of the present disclosure.

As shown in FIG. 2, an object tracking method according to one embodiment includes the following steps.

Step 201: obtaining images captured by the at least two cameras, respectively; and respectively identifying objects in the images captured by the at least two cameras.

In one embodiment, the object may refer to a person or other objects, such as animals, and motor vehicles, which are not further limited herein. In this embodiment, taking the method applied to two cameras as an example for illustration, apparently, when the method may be applied to a larger number of cameras, operation principle is basically the same.

Methods for identifying objects in an image may refer to the image identification technology and the instance segmentation technology in the related art, which will not be further defined and described herein.

Step 202: obtaining a feature value of each object, and calculating a position of the object in each image in a global coordinate system.

In one embodiment, coordinates and the feature values of the objects are used as references to determine whether the objects captured by different cameras are an identical object.

The feature value refers to a value of features of an object, which may be extracted by the feature extraction technology. Specifically, the feature value may be obtained by extracting unique features such as appearance feature, serial number, and license plate number.

Since each image is corresponding to a specific region in the real world and each position in the image is corresponding to a position in the real world, then, after the global coordinate system is established, each position in the image has corresponding coordinates in the global coordinate system. Therefore, coordinates of one object in the global coordinate system can be obtained according to a position of the one object in the image.

Step 203: when there are two objects (which may be referred as target objects), which are respectively in images captured by different cameras and have an overall difference value thereof being less than a threshold, counting the two objects as an identical object.

In this embodiment, the overall difference value is a value determined according to a feature difference value and a position difference value of the two objects. By comprehensively considering positions and features of the objects, the accuracy of counting objects can be improved It should be understood that due to technical limitations, there will be some errors in calculation of features and positions. For example, generally, one camera is set obliquely above and takes an image at an oblique angle, and the captured image is a two-dimensional image. Thus, only two-dimensional coordinates of an object in the image can be obtained. However, real-world coordinates are three-dimensional coordinates. Then, when the coordinates in the images captured by different cameras are converted into coordinates of the global coordinate system, there may be certain error.

Further, different cameras have different angles with respect to an identical object, and then extracted features also have some differences. For example, when capturing an identical object, one camera may capture a front image of the object, the other camera may capture a back image of the object, and then there is a certain difference between the two images captured by the two cameras.

Therefore, in this embodiment, the features and positions of the objects are comprehensively considered, and an overall difference value between two objects is determined according to feature difference and position difference between the two objects. When the overall difference value is less than the threshold, coordinates of the two objects captured by different cameras are basically the same, and the features of the two objects captured by different cameras are basically the same, then the two objects (i.e., target objects) captured by different cameras are actually the identical object.

In one embodiment of the present disclosure, by identifying objects in the images captured by different cameras and judging whether any two objects captured by the various cameras are an identical object according to feature difference and position difference between the any two objects, thereby counting the same objects captured by different cameras as an identical object, and then improving accuracy of counting objects and accuracy of tracking the objects.

Optionally, in one implementation, the obtaining a feature value of each object in the above step 202, includes: extracting a feature vector of each object as the feature value of each object.

After obtaining the feature value of each object, the method further includes:

calculating square of a difference value between feature vectors of any two objects;

obtaining a calculation result by performing batch norm (BN) calculation and fully connected layers (FC) calculation on the square of the difference value, and taking a probability value obtained by processing the calculation result through an S-shaped growth curve function (Sigmoid function) as a feature difference value of the two objects. The difference between two objects decreases as the probability value increases.

In one embodiment, the feature value of each object is first extracted in manners such as pedestrian detection technique, multi-target tracking technique and pedestrian re-identification technique in the related art, which will not be further defined and described herein.

Figure 3:
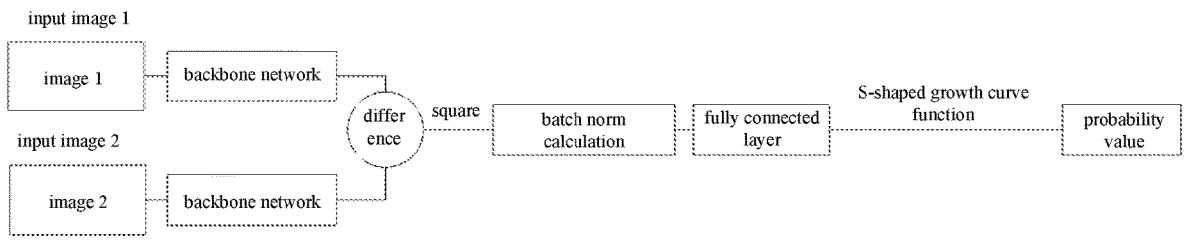
FIG. 3 is a flowchart of calculating a similarity probability of feature values according to an embodiment of the present disclosure.

As shown in FIG. 3, in one implementation, features of two objects are first extracted through the backbone network. The backbone network may employ network structure commonly used in the field of deep learning, which includes, but not limited to, the backbone network such as resnet 50.

Then, a difference value between feature vectors of the two objects is calculated and the difference value is squared. Further, the batch norm (BN) calculation and fully connected layers (FC) calculation are performed on the square of the difference value with a calculation result obtained, and then the calculation result is processed through the S-shaped growth curve function, thereby obtaining the probability value that the two objects are an identical object.

The batch norm calculation helps to reduce difference in value ranges between different samples, so that most of data is in an unsaturated region, thereby ensuring better back-propagation of gradient, so as to accelerate the convergence of the network. Next, the fully connected layers reassemble local features extracted during the batch norm calculation into a complete feature through the weight matrix.

The Sigmoid function is a function with an output value between 0 and 1. Through the Sigmoid function, the difference of the processed feature vectors can be mapped to a value between 0 and 1, which may be taken as the probability value that the two objects are an identical object.

The larger the probability value, the higher the degree of similarity between the two feature vectors, and the higher the probability that the two objects corresponding to two images are actually the identical object.

In the implementation, A large number of positive and negative samples are used to train the overall network structure to obtain a model that meets requirements for extracting features and calculating probability values of similarity.

Optionally, in one implementation, the calculating a position of the object in each image in a global coordinate system in the above step 202, includes:

calculating coordinates of each object in each image, respectively;

obtaining a conversion homography matrix of coordinates in different images and coordinates in a global coordinate system;

converting the coordinates of each object in each image into coordinates in the global coordinate system through the conversion homography matrix, and taking the coordinates in the global coordinate system as the position of the each object in each image in the global coordinate system.

The objects in one embodiment may be various objects such as a motor vehicle, a product, an animal, a pedestrian, which will not be further defined and described herein. In this embodiment, a pedestrian is used as an example for description.

In case that a tracked object is a pedestrian, the coordinates for determining the position of the object may select different coordinates, and determination of the position of the pedestrian can be achieved. For example, head coordinates or hand coordinates may be selected.

In an optional embodiment, the position of the pedestrian may be determined according to foot coordinates of the pedestrian. It should be understood that an image captured by the camera is a two-dimensional image, coordinates of other parts such as heads of two pedestrians in the image captured by one camera may overlap, while coordinates of feet are usually impossible to overlap. Thus, in this embodiment, the position of each pedestrian in the global coordinate system may be determined based on the foot coordinates.

In implementation, foot coordinates uvsA of objects in the image captured by the camera A and foot coordinates uvsB of objects in the image captured by the camera B are first determined respectively. Then, the global coordinate system XO2Y is established to obtain coordinates xyA and xyB of the objects in the global coordinate system.

If the camera A captures M objects, since one point in a plane has two degrees of freedom, the obtained uvsA includes M*2 coordinates. Similarly, if the camera B captures N objects, the obtained uvsB includes N*2 coordinates.

Specifically, a conversion homography matrix of coordinates in different images and coordinates in the global coordinate system is first obtained. The conversion homography matrix may be obtained during each calculation, or may be stored after the calculation for subsequent conversion process.

Figures 4, 5:
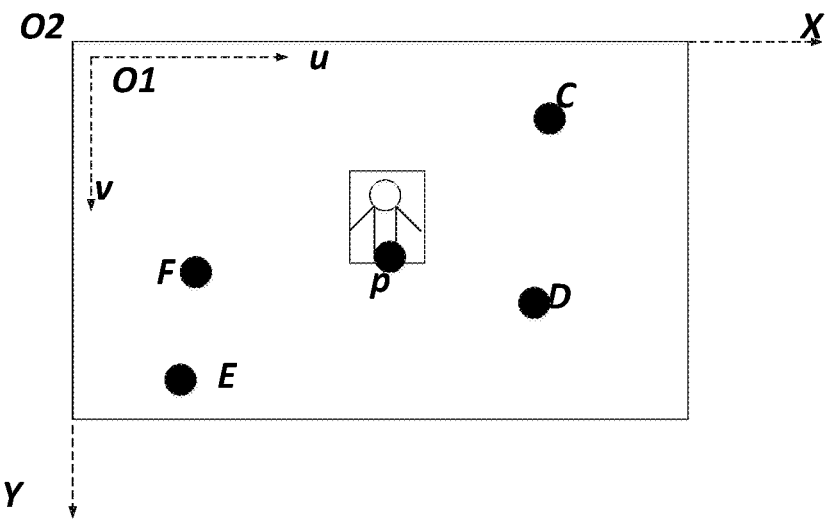
FIG. 4 is a schematic diagram of coordinate transformation according to an embodiment of the present disclosure.
FIG. 5 is a schematic diagram of recording tables according to an embodiment of the present disclosure.

Taking the conversion homography matrix corresponding to the camera A as an example, as shown in FIG. 4, firstly, four different points C, D, E, F are randomly selected in the monitoring area of the camera A. Then, by measurement, coordinates of the four points in the global coordinate system X02Y are (X1, Y1), (X2, Y2), (X3, Y3) and (X4, Y4). Meanwhile, according to the image captured by the camera A, coordinates of the four points in the image coordinate system uO1v are (u1, v1), (u2, v2), (u3, v3) and (u4, v4).

Further, the coordinates of the four points in the global coordinate system and the coordinates of the four points in the image coordinate system are substituted into the following equations:

$$\begin{bmatrix} X \\ Y \\ 1 \end{bmatrix} = H \begin{bmatrix} u \\ v \\ 1 \end{bmatrix} \quad (1)$$

A conversion homography matrix H is obtained by solving the above equations. The obtained conversion homography matrix H represents conversion relationship between the coordinates in the image captured by the camera A and the coordinates in the global coordinate system.

Further, coordinates p(up, vp) of one object may be converted into coordinates in the global coordinate system by the above conversion homography matrix H.

Optionally, after obtaining a feature value of each object, and calculating a position of the object in each image in a global coordinate system, the method further includes: calculating a weighted average value of a feature difference value and a position difference value of two objects as an overall difference value of the two objects.

The calculation of the feature difference value may refer to the forgoing embodiment. The position difference value may be calculated according to coordinates in the global coordinate system.

For example, coordinate of an object A captured by the camera A in the global coordinate system are (xA, yA), and coordinate of an object B captured by the camera B in the global coordinate system are (xB, yB), then a distance difference between the object A and the object B in the global coordinate system is calculated according to the following formula:

$$d = \sqrt{(xA-xB)^2 + (yA-B2)^2} \quad (2)$$

Further, the overall difference value of the two objects can be calculated through the following formula:

$$\text{cost}_{matrix} = \text{distance}_{cost_{matrix}} + \gamma^* \text{cosine\_cost\_matrix} \quad (3)$$

where $\text{cost}_{matrix}$ is an overall difference value of two objects; $\text{distance}_{cost_{matrix}}$ is a distance cost, which is specifically the distance d calculated by the above formula (2); and $\gamma^*$cosine_cost_matrix is a similarity cost matrix, and $\gamma$ is a weight.

It should be understood that the above overall difference value is only a weighted average value of two results, thus it is only necessary to set a weight for one of them. The value of the weight may be set according to actual conditions. For example, if an image distortion degree of one camera is large, the weight value may be set relatively large; and if an imaging distortion degree of one camera is small, the weight value may be set relatively small. Apparently, setting conditions for the weight are not limited thereto, and may be selected according to experience or actual conditions in actual implementation, which will not be further defined and described herein. In one embodiment, the weight $\gamma$ is 1 as an example for description.

It should be understood that if coordinates of two objects captured by different cameras are closer, the higher the similarity is, the more likely the two objects are an identical object. Thus, by calculating an overall difference value of two objects captured by different cameras, the probability that the two objects are the identical object can be determined according to the overall difference value. When the overall difference value is less than the threshold, it indicates that the coordinates of the two objects are substantially the same and the similarity is high. Then, the probability that the two objects are the identical object is high, and the two objects can be counted as the identical object.

The overall difference value between any two objects may be calculated through the following formula (3) and then whether the two objects match is determined according to relationship between the overall difference value and the threshold. For example, when setting the threshold to 0.3, if the overall difference value is greater than the threshold, the two objects are considered to be unmatched and are different objects; if the overall difference value is less than or equal to the threshold, the two objects are considered to be matched and are actually the identical object.

Apparently, the threshold may be set to a value greater than 0 and less than 1 according to actual situations. For example, the threshold may be set to various values such as 0.1, 0.2 and 0.5, which will not be further defined and described herein.

Optionally, the at least two cameras include a first camera and a second camera. After counting the two objects as an identical object, the method further includes:

numbering objects captured by the first camera and the second camera with numbers respectively, and taking the numbers as identity information of the corresponding objects;

recording in a first list, the identity information of matched identical objects among the objects captured by the first camera and the second camera, and setting a same index value corresponding to each group of matched identical objects;

establishing a second list according to the identity information of the objects captured by the first camera in the first list, and filling the second list according to the objects captured by the first camera and corresponding index values recorded in the first list; where a length of the second list is the number of objects captured by the first camera;

establishing a third list according to the identity information of the objects captured by the second camera in the first list, and filling the third list according to the objects captured by the second camera and corresponding index values recorded in the first list; where a length of the third list is the number of objects captured by the second camera.

In one embodiment, as an example for illustration, the first camera is the camera A, and the second camera is the camera B.

In implementation, the camera A captures 9 objects, which are sequentially numbered from 1 to 9, specifically, idA_1 to idA_9; and the camera B captures 8 objects, which are sequentially numbered from 1 to 8, specifically, idB_1 to idB_8. The objects having identical object values are idA_1 and idB_1, idA_2 and idB_3, idA_4 and idB_5, idA_5 and idB_6, idA_6 and idB_7, idA_9 and idB_8, respectively. That is, these objects are counted as the identical objects, respectively.

A first list matches_list is created and these matched objects are recorded in the first list. As shown in FIG. 5, a left column of numbers in the first list represents a number N of an identity number id1_N of an object in the first list.

Then, a second list and a third list are established according to the identity information of the objects in the first list. Specifically, a maximum value of M in idA_M in the first list is 9, that is, there are 9 objects in total, and then the second list of a length 9 is created. The second list is filled according to the objects and corresponding index values in the first list. Similarly, the third list of a length 8 is created and the third list is filled accordingly.

A left column of numbers in each of the second list and the third list represents identity numbers. A right column of numbers in each of the second list and the third list represents corresponding values.

For example, an object idA_9 has an ID of 9 and an object value of 6 in the second list. An object idB_8 has an ID of 8 and an object value of 6 in the third list.

Optionally, after establishing a second list according to the identity information of the objects captured by the first camera in the first list, the method further includes: filling the second list according to objects captured by the first camera which are not recorded in the first list and index values; and/or, after establishing a third list according to the identity information of the objects captured by the second camera in the first list, the method further includes: filling the third list according to objects captured by the second camera which are not recorded in the first list and index values.

It should be understood that only the objects captured by both of the first camera and the second camera are recorded in the first list, and some objects are not captured by both of the first camera and the second camera. For example, there may be one object, only the first camera captures images of the one object and the second camera captures no image of the one object. This one object is still needed to be counted. Otherwise, the number of objects may be incorrectly counted. Therefore, in one embodiment, the one object is further recorded in the corresponding second list or the third list, and is labeled with a specific index value to distinguish the one object from objects in the first list.

Specifically, object values of other objects in the second list and the third list are uniformly adjusted to a specific value, for example, 0 or −1, which is exemplified by −1 in this embodiment. It can be understood that the unmatched objects are not recorded in the first list and there is no corresponding value in the first list, but the objects exist and then a value is uniformly assigned for them in order to facilitate counting. For example, an object idA_3 in the second list shown in FIG. 5 appears only in the monitoring area of the camera A, but does not appear in the monitoring area of the camera B, thus it is not recorded in the first list and then is assigned −1.

It can be understood that if one object advances in a direction indicated by a curved arrow in FIG. 1, when the one object is located in the region 1, the one object can be captured only by the camera A, and then the one object is only recorded in the second list. When the one object moves to the region 2, the one object can be simultaneously captured by both of the camera A and the camera B, then the one object is simultaneously recorded in the first list, the second list and the third list. When the one object moves to the region 3, the one object moves out of the monitoring range of the camera A, and then, the one object is removed from the first list and the second list and is recorded only in the third list with an object value of −1 in the third list.

It can be understood that each of the second list and the third list specifically includes a matching list and a non-matching list. In implementation, whether the two objects match is determined according to the above formula (3); if the two objects match, they are recorded in the matching list with corresponding object values in the second list and the third list; if the two objects does not match, they are recorded in the non-matching list with a specific index value such as −1 instead of object values. In this way, according to recording results, counting the number of objects in a specific area and tracking of movement trajectory of the objects can be realized with relatively high accuracy, thereby reducing deviation caused by repeated counting of the same object.

Figure 6:
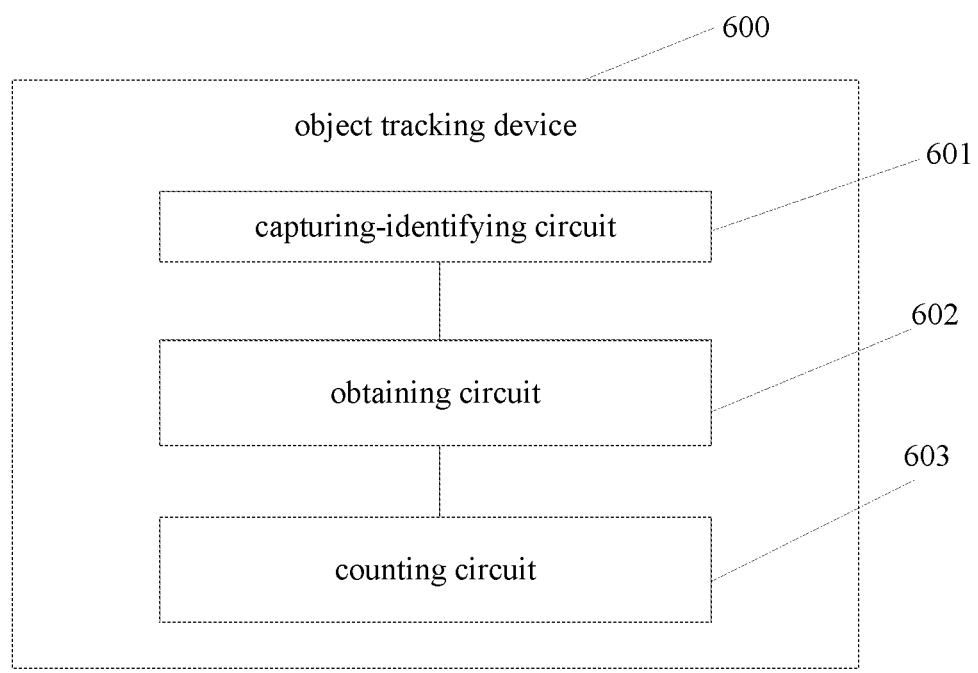
FIG. 6 is a schematic diagram of an object tracking device according to an embodiment of the present disclosure.

As shown in FIG. 6, one embodiment of the present disclosure provides an object tracking device 600, which is applied to an image capturing system. The image capturing system includes at least two cameras. There is at least partial overlap in image capturing areas of the at least two cameras. The object tracking device 600 includes:

a capturing-identifying circuit 601 configured to obtain images captured by the at least two cameras, respectively; and respectively identify objects in the images captured by the at least two cameras;

an obtaining circuit 602 configured to obtain a feature value of each object, and calculate a position of the object in each image in a global coordinate system;

a counting circuit 603 configured to, when there are two objects (which may be referred as target objects), which are respectively in images captured by different cameras and have an overall difference value thereof being less than a threshold, count the two objects as an identical object.

Optionally, the obtaining circuit 602 includes: an extraction sub-circuit configured to extract a feature vector of each object as the feature value of each object.

The object tracking device 600 further includes:

a feature vector difference calculation circuit configured to calculate square of a difference value between feature vectors of any two objects;

a probability calculation circuit configured to obtain a calculation result by performing batch norm (BN) calculation and fully connected layers (FC) calculation on the square of the difference value, and take a probability value obtained by processing the calculation result through an S-shaped growth curve function (Sigmoid function) as a feature difference value of the two objects; where the difference between two objects decreases as the probability value increases.

Optionally, the obtaining circuit 602 includes:

a coordinate calculation sub-circuit configured to calculate coordinates of each object in each image, respectively;

a matrix obtaining sub-circuit configured to obtain a conversion homography matrix of coordinates in different images and coordinates in a global coordinate system;

a conversion sub-circuit configured to convert the coordinates of each object in each image into coordinates in the global coordinate system through the conversion homography matrix, and take the coordinates in the global coordinate system as the position of the each object in the global coordinate system.

Optionally, the object tracking device 600 further includes: an overall difference value calculation circuit configured to calculate a weighted average value of a feature difference value and a position difference value of two objects as an overall difference value of the two objects.

Optionally, the at least two cameras include a first camera and a second camera. The object tracking device 600 further includes:

a numbering circuit configured to number objects captured by the first camera and the second camera with numbers respectively, and take the numbers as identity information of the corresponding objects;

a recording circuit configured to record in a first list, the identity information of matched identical objects among the objects captured by the first camera and the second camera, and set a same index value corresponding to each group of matched identical objects;

a first filling circuit configured to establish a second list according to the identity information of the objects captured by the first camera in the first list, and fill the second list according to the objects captured by the first camera and corresponding index values recorded in the first list; where a length of the second list is the number of objects captured by the first camera;

a second filling circuit configured to establish a third list according to the identity information of the objects captured by the second camera in the first list, and fill the third list according to the objects captured by the second camera and corresponding index values recorded in the first list; where a length of the third list is the number of objects captured by the second camera.

Optionally, the first filling circuit is further configured to fill the second list according to objects captured by the first camera which are not recorded in the first list and index values; and/or, the second filling circuit is further configured to fill the third list according to objects captured by the second camera which are not recorded in the first list and index values.

The object tracking device 600 of the present disclosure can implement steps of the object tracking method of the above embodiment, and can achieve the same technical effects, which will not be repeated here.

Optionally, one embodiment of the present disclosure further provides an electronic device including a processor, a memory, and a computer program stored in the memory and executable on the processor. The processor executes the computer program to implement steps of the object tracking method of the above embodiment, and can achieve the same technical effects, which will not be repeated here.

One embodiment of the present disclosure further provides a computer readable medium, which stores a computer program thereon. The program is executed by a processor to implement steps of the object tracking method of the above embodiment, and can achieve the same technical effects, which will not be repeated here. The computer readable storage medium may be, for example, read-only memory (ROM), random access memory (RAM), disk or optical disk.

Those skilled in the art will appreciate that embodiments of the present disclosure may be provided as a method, system, or computer program product. Accordingly, the present disclosure may take the form of an entirely hardware embodiment, an entirely software embodiment, or a combination of software and hardware. Moreover, the present disclosure can take the form of a computer program product embodied on one or more computer-usable storage media (including but not limited to disk storage, CD-ROM, optical storage, etc.) including computer usable program codes.

The present disclosure has been described with reference to the flow charts and/or block diagrams of the method, device (system) and computer program product according to the embodiments of the present disclosure. It should be understood that computer program instructions may be used to implement each of the work flows and/or blocks in the flow charts and/or the block diagrams, and the combination of the work flows and/or blocks in the flow charts and/or the block diagrams. These computer program instructions may be provided to a processor of a common computer, a dedicate computer, an embedded processor or any other programmable data processing devices to create a machine, so that instructions executable by the processor of the computer or the other programmable data processing devices may create a device to achieve the functions assigned in one or more work flows in the flow chart and/or one or more blocks in the block diagram.

These computer program instructions may also be stored in a computer readable storage that may guide the computer or the other programmable data process devices to function in a certain way, so that the instructions stored in the computer readable storage may create a product including an instruction unit which achieves the functions assigned in one or more flows in the flow chart and/or one or more blocks in the block diagram.

These computer program instructions may also be loaded in the computer or the other programmable data process devices, so that a series of operation steps are executed on the computer or the other programmable devices to create processes achieved by the computer. Therefore, the instructions executed in the computer or the other programmable devices provide the steps for achieving the function assigned in one or more flows in the flow chart and/or one or more blocks in the block diagram.

In a typical configuration, a computing device includes one or more processors (CPUs), input/output interfaces, network interfaces, and a memory.

The memory may include a non-persistent memory, a random access memory (RAM) and/or non-volatile memory in a computer readable medium, such as read only memory (ROM) or flash memory. The memory is an example of a computer readable medium.

The computer readable media may be permanent and non-persistent, removable and non-removable media, which can store information by any method or technology. The information may be computer-readable instructions, data structures, modules of a program, or other data. Examples of the computer storage media include, but are not limited to, phase change memory (PRAM), static random access memory (SRAM), dynamic random access memory (DRAM), other types of random access memory (RAM), and read-only memory (ROM), electrically erasable programmable read-only memory (EEPROM), flash memory or other memory technology, read-only disc read-only memory (CD-ROM), digital versatile disc (DVD) or other optical storage, magnetic tape cartridges, magnetic tape magnetic disk storage or other magnetic storage devices or any other non-transmission media which may be used to store information that can be accessed by computing devices. As defined herein, the computer-readable media does not include computer-readable transitory media such as modulated data signals and carrier waves.

It should be noted that, the terms "comprise", "include" or any other variations are intended to encompass a non-exclusive inclusion, such that a process, method, system, article or device that include a series of steps or elements include not only those steps or elements but also other steps or elements that are not explicitly listed, or steps or elements that are inherent to such process, method, article or device. Without more restrictions, an element defined by the sentence "including a . . . " does not exclude that there are other identical elements in the process, method, article or device that includes the element.

Through the description of the above embodiments, those skilled in the art can clearly understand that the methods in the above embodiments may be implemented by means of software plus a necessary universal hardware platform, and of course, may be implemented by hardware, but in many cases the former is better implementation. Based on such understanding, the technical solution of the present disclosure that is essentially or contributes to the existing technology may be embodied in the form of a software product, which is stored in a storage medium (such as ROM/RAM, magnetic disk, optical disc) including several instructions for causing a terminal device (which may be a mobile phone, a computer, a server, an air conditioner, or a network device) to execute the methods described in the embodiments of the present disclosure.

The above are only the specific embodiments of the present disclosure, but the protection scope of the present disclosure is not limited to these embodiments. Any technical personnel who is familiar with the technical field can easily think of changes or substitutions within the technical scope of the present disclosure and these changes and substitutions should be included in the protection scope of the present disclosure.

What is claimed is:

1. An object tracking method applied to an image capturing system which includes at least two cameras having image capturing areas at least partially overlapped, the object tracking method comprising:
    obtaining images captured by the at least two cameras, respectively; and respectively identifying objects in the images captured by the at least two cameras;
    obtaining a feature value of each object, and calculating a position of each object in each image in a global coordinate system;
    when there are two objects, which are respectively in the images captured by the at least two cameras and have an overall difference value being less than a threshold, counting the two objects as an identical object; wherein the overall difference value is a value determined according to a feature difference value and a position difference value of the two objects,
    wherein the obtaining a feature value of each object, includes extracting a feature vector of each object as the feature value of each object,
    wherein after the obtaining a feature value of each object, the method further includes:
        calculating square of a difference value between feature vectors of any two objects; and
        obtaining a calculation result by performing batch norm calculation and fully connected layers calculation on the square of the difference value, and taking a probability value obtained by processing the calculation result through an S-shaped growth curve function as a feature difference value of the any two objects, and
    wherein a difference between the any two objects decreases as the probability value increases.

2. The method according to claim 1, wherein the calculating a position of each object in each image in a global coordinate system, includes:
    calculating coordinates of each object in each image, respectively;
    obtaining a conversion homography matrix of coordinates in each image and coordinates in the global coordinate system;
    converting the coordinates of each object in each image into coordinates in the global coordinate system through the conversion homography matrix, and taking the coordinates in the global coordinate system as the position of the each object in the global coordinate system.

3. The method according to claim 1, wherein after the obtaining a feature value of each object, and calculating a position of each object in each image in a global coordinate system, the method further includes:
    calculating a weighted average value of a feature difference value and a position difference value of any two objects as an overall difference value of the any two objects.

4. The method according to claim 1, wherein the at least two cameras include a first camera and a second camera; after counting the two objects as an identical object, the method further includes:

numbering objects captured by the first camera and the second camera with numbers respectively, and taking the numbers as identity information of the corresponding objects;

recording in a first list, the identity information of matched identical objects among the objects captured by the first camera and the second camera, and setting a same index value corresponding to each group of matched identical objects;

establishing a second list according to the identity information of the objects captured by the first camera in the first list, and filling the second list according to the objects captured by the first camera and corresponding index values recorded in the first list; wherein a length of the second list is the number of objects captured by the first camera;

establishing a third list according to the identity information of the objects captured by the second camera in the first list, and filling the third list according to the objects captured by the second camera and corresponding index values recorded in the first list; wherein a length of the third list is the number of objects captured by the second camera.

5. The method according to claim 4, wherein after the establishing a second list according to the identity information of the objects captured by the first camera in the first list, the method further includes: filling the second list according to objects captured by the first camera which are not recorded in the first list and index values.

6. The method according to claim 4, wherein after the establishing a third list according to the identity information of the objects captured by the second camera in the first list, the method further includes: filling the third list according to objects captured by the second camera which are not recorded in the first list and index values.

7. An object tracking device applied to an image capturing system which includes at least two cameras having image capturing areas at least partially overlapped, the object tracking device comprising:

a capturing-identifying circuit configured to obtain images captured by the at least two cameras, respectively; and respectively identify objects in the images captured by the at least two cameras;

an obtaining circuit configured to obtain a feature value of each object, and calculate a position of each object in each image in a global coordinate system; and a counting circuit configured to, when there are two objects, which are respectively in the images captured by the at least two cameras and have an overall difference value being less than a threshold, count the two objects as an identical object; wherein the overall difference value is a value determined according to a feature difference value and a position difference value of the two objects, wherein the at least two cameras include a first camera and a second camera, wherein the object tracking device further includes:

a numbering circuit configured to number objects captured by the first camera and the second camera with numbers respectively, and take the numbers as identity information of the corresponding objects;

a recording circuit configured to record in a first list, the identity information of matched identical objects among the objects captured by the first camera and the second camera, and set a same index value corresponding to each group of matched identical objects;

a first filling circuit configured to establish a second list according to the identity information of the objects captured by the first camera in the first list, and fill the second list according to the objects captured by the first camera and corresponding index values recorded in the first list, wherein a length of the second list is the number of objects captured by the first camera; and a second filling circuit configured to establish a third list according to the identity information of the objects captured by the second camera in the first list, and fill the third list according to the objects captured by the second camera and corresponding index values recorded in the first list wherein a length of the third list is the number of objects captured by the second camera.

8. The device according to claim 7, wherein the obtaining circuit includes: an extraction sub-circuit configured to extract a feature vector of each object as the feature value of each object;

the object tracking device further includes:

a feature vector difference calculation circuit configured to calculate square of a difference value between feature vectors of any two objects;

a probability calculation circuit configured to obtain a calculation result by performing batch norm calculation and fully connected layers calculation on the square of the difference value, and take a probability value obtained by processing the calculation result through an S-shaped growth curve function as a feature difference value of the any two objects; wherein difference between the any two objects decreases as the probability value increases.

9. The device according to claim 7, wherein the obtaining circuit includes:

a coordinate calculation sub-circuit configured to calculate coordinates of each object in each image, respectively;

a matrix obtaining sub-circuit configured to obtain a conversion homography matrix of coordinates in each image and coordinates in the global coordinate system;

a conversion sub-circuit configured to convert the coordinates of each object in each image into coordinates in the global coordinate system through the conversion homography matrix, and take the coordinates in the global coordinate system as the position of the each object in the global coordinate system.

10. The device according to claim 7, wherein the object tracking device further includes: an overall difference value calculation circuit configured to calculate a weighted average value of a feature difference value and a position difference value of any two objects as an overall difference value of the any two objects.

11. The device according to claim 7, wherein the first filling circuit is further configured to fill the second list according to objects captured by the first camera which are not recorded in the first list and index values.

12. The device according to claim 7, wherein the second filling circuit is further configured to fill the third list according to objects captured by the second camera which are not recorded in the first list and index values.

13. An electronic device comprising: a processor, a memory, and a computer program stored in the memory and executable on the processor; wherein the processor executes the computer program to implement steps of the object tracking method according to claim 1.

14. A computer readable medium comprising a computer program thereon; wherein the computer program is executed by a processor to implement steps of the object tracking method according to claim 1.

15. An object tracking method applied to an image capturing system which includes at least two cameras having image capturing areas at least partially overlapped, the object tracking method comprising:
- obtaining images captured by the at least two cameras, respectively; and respectively identifying objects in the images captured by the at least two cameras;
- obtaining a feature value of each object, and calculating a position of each object in each image in a global coordinate system; and
- when there are two objects, which are respectively in the images captured by the at least two cameras and have an overall difference value being less than a threshold, counting the two objects as an identical object; wherein the overall difference value is a value determined according to a feature difference value and a position difference value of the two objects,
- wherein the at least two cameras include a first camera and a second camera, and
- wherein, after counting the two objects as an identical object, the method further includes:
  - numbering objects captured by the first camera and the second camera with numbers respectively, and taking the numbers as identity information of the corresponding objects;
  - recording in a first list, the identity information of matched identical objects among the objects captured by the first camera and the second camera, and setting a same index value corresponding to each group of matched identical objects;
  - establishing a second list according to the identity information of the objects captured by the first camera in the first list, and filling the second list according to the objects captured by the first camera and corresponding index values recorded in the first list; wherein a length of the second list is the number of objects captured by the first camera; and
  - establishing a third list according to the identity information of the objects captured by the second camera in the first list, and filling the third list according to the objects captured by the second camera and corresponding index values recorded in the first list; wherein a length of the third list is the number of objects captured by the second camera.

* * * * *